(12) United States Patent
Rosenast

(10) Patent No.: US 6,654,528 B2
(45) Date of Patent: Nov. 25, 2003

(54) ALIGNING SLEEVE FOR A BUNDLE OF FIBEROPTIC CYLINDRICAL FIBERS

(75) Inventor: Erich A. Rosenast, Thousand Oaks, CA (US)

(73) Assignee: Rifocs Corporation, Camarillo, CA (US)

( * ) Notice: Subject to any disclaimer, the term of this patent is extended or adjusted under 35 U.S.C. 154(b) by 57 days.

(21) Appl. No.: 10/095,804

(22) Filed: Feb. 19, 2002

(65) Prior Publication Data

US 2003/0156807 A1 Aug. 21, 2003

(51) Int. Cl.$^7$ ................................................. G02B 6/04
(52) U.S. Cl. ........................................ 385/115; 385/116
(58) Field of Search ................................ 385/115, 116, 385/120, 121; 165/184, 185

(56) References Cited

U.S. PATENT DOCUMENTS

| | | |
|---|---|---|
| 2,825,260 A | 3/1958 | O'Brien |
| 3,225,193 A | 12/1965 | Hilton |
| 4,175,940 A | 11/1979 | Siegmund |
| 4,690,500 A | 9/1987 | Hayami et al. |
| 4,743,082 A | 5/1988 | Mori |
| 5,553,184 A * | 9/1996 | Eikelmann et al. ......... 385/115 |
| 5,715,345 A * | 2/1998 | McKinley ................... 385/115 |
| 5,881,195 A | 3/1999 | Walker |
| 6,260,614 B1 * | 7/2001 | Guy ....................... 385/115 X |

OTHER PUBLICATIONS

Square–hole Micro Capillary (Catalog Pages), Nippon Electric Glass Co., Ltd., Electronic Glass Materials Division, Sales, Japan.

* cited by examiner

Primary Examiner—Phan T. H. Palmer
(74) Attorney, Agent, or Firm—Pillsbury Winthrop LLP

(57) ABSTRACT

An aligning sleeve for a bundle of fiberoptic cylindrical fibers which comprises an elongated body formed of rigid material with the body having a fore end and an aft end. A passage is formed within the body extending from the fore end to the aft end with this through passage being hexagonally shaped in transverse section. Six in number of evenly spaced longitudinal corners are formed within the hexagonal shaped opening with each corner adapted to have nested therein a longitudinally oriented fiber. All the remaining fibers of the bundle align with these corner fibers with the result that all fibers in a bundle are located parallel to each other and tightly packed within the through passage.

15 Claims, 4 Drawing Sheets

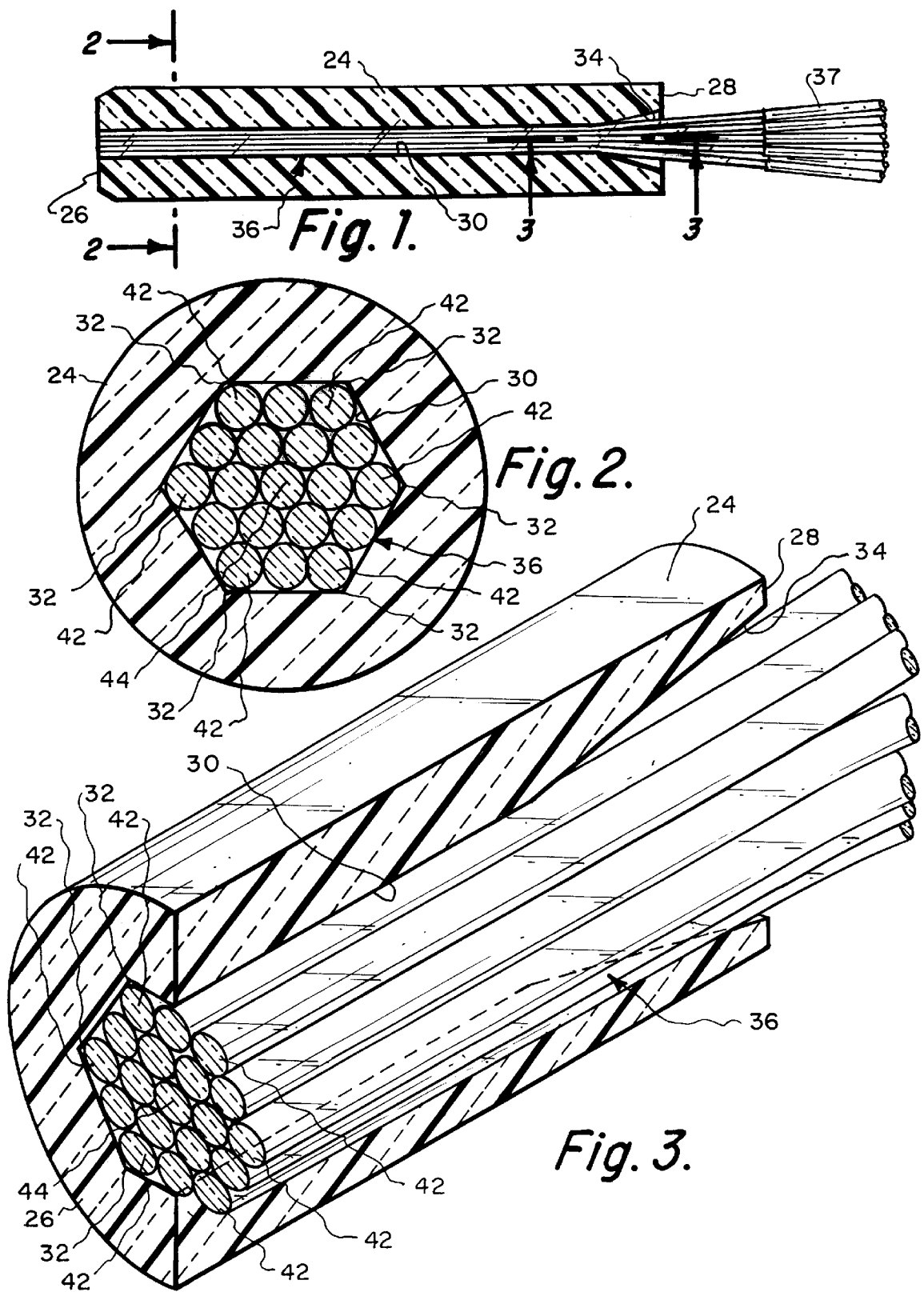

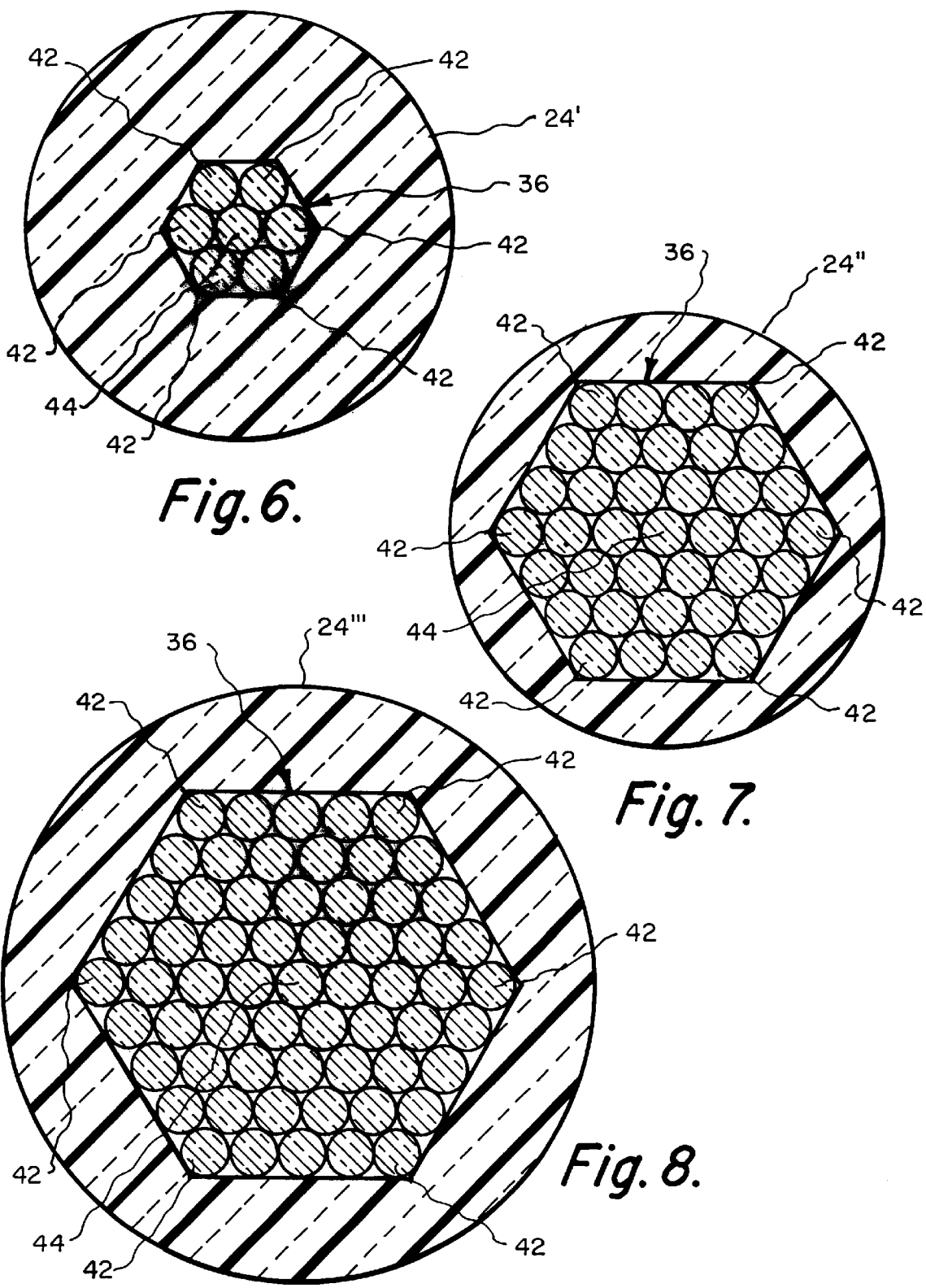

US 6,654,528 B2

ALIGNING SLEEVE FOR A BUNDLE OF FIBEROPTIC CYLINDRICAL FIBERS

BACKGROUND OF THE INVENTION

1. Field of the Invention

The field of this invention relates to fiberoptic fibers and more particularly to the bundling together of a plurality of fiberoptic fibers which are used to transmit light pulses from an appropriate light source.

2. Description of the Related Art

Typical fiberoptic fibers are constructed of pure silica or doped silica glass and include a center core about which is located a cladding. Both the core and the cladding are constructed of silica glass. Typically, a fiberoptic fiber is one hundred and twenty five microns in diameter. Some cores could be as small as four to ten microns (single mode) in diameter while other cores may be fifty microns (multimode) in diameter or greater. This means that the cladding can range from a thickness of less than thirty microns to greater than sixty microns. The light that is being transmitted by the core is confined to the core by the cladding. Any attempt by the light to exit the side of the core is reflected by total internal reflection. Typically core cladding configuration is constructed according to the particular usage. For example, a core could be constructed to transmit light pulses in the range of six hundred and thirty nanometers (nm), eight hundred and fifty nanometers, nine hundred and ten nanometers, thirteen hundred nanometers or fifteen hundred and fifty nanometers. It is to be understood that the foregoing nanometer range is typical but actually the fiber could be constructed to transmit any nanometer value of light.

Generally, a plurality of the fiberoptic fibers are bundled together in a tightly packed environment. This bundle of fiberoptic fibers has a light entry end with this light entry end to be connected to an appropriate light source. This appropriate light source can transmit a different signal within each fiber or it could transmit the same signal within each fiber. The number of fibers within a bundle can be two in number or could actually be thousands in number. The fibers are mounted in a sleeve which comprises the tightly packed environment. A typical prior art sleeve has a circular through passage. It has been found that placing the fibers within a circular through passage, and even though such are tightly restrained, some of the fibers will actually assume slightly non-parallel positions relative to other fibers. The efficiency of transmission of the light is significantly improved if all of the fibers in the bundle are located precisely parallel to each other. The greater the parallel relationship of the fibers at the entry end of the bundle, the greater the efficiency of transmission.

A typical sleeve that is used to tightly restrain the bundle of fiberoptic fibers is generally in the range of ten to twenty millimeters in length. Generally, the longer the sleeve, the greater the chance that the fibers that are restrained by the sleeve are located more precisely parallel to each other. However, because the sleeve contains a circular through passage, it has been found to be difficult to achieve the high degree of parallel relationship between the fibers that is required. Bundled fibers are used to transmit light pulses.

During the manufacturing of a bundle of fibers, it may be necessary to measure the angular deviation between the fibers to make sure that the fibers are located within a certain tolerance factor. The bundle of fibers prior to being placed within the aligning sleeve are impregnated with an epoxy resin. The grouping of the fibers is then forced into the aligning sleeve and the resin permitted to harden. The outer end of the fibers are then cut forming an entry end for the transmission of the signals which is in alignment with the outer end of the aligning sleeve. When testing for angular deviation to determine if there is any fiber that is not within the selected tolerance for deviation, which occurs after curing of the epoxy resin, any fiber that is not within the selected tolerance level will cause the bundle of fibers to be rejected and not be usable. In the past, this rejection level during manufacture can exceed fifty percent. This is an exceedingly high degree of rejection and greatly magnifies manufacturing cost. It would be desirable to design an aligning sleeve in a manner to substantially eliminate the rejection of the bundled fibers so that all of the fibers within the aligning sleeve are located precisely parallel to each other. This will mean that the projected light emanated from each fiber will be accurately defined.

SUMMARY OF THE INVENTION

The first basic embodiment of the present invention comprises constructing an aligning sleeve for a bundle of fiberoptic cylindrical fibers which has an elongated body formed of a rigid material with the body having a fore end and an aft end. A through passage is formed within the body extending from the fore end to the aft end. The through passage is hexagonally shaped in transverse cross-section forming six in number of evenly spaced longitudinal corners with a single fiberoptic fiber to nest in a corner defining a series of corner fibers. A corner is defined as a longitudinal joint connecting two flat surfaces of the hexagonal shaped through passage. The corner can be sharply formed or rounded. All remaining fibers of the bundle precisely align with these corner fibers resulting in all the fibers in the bundle being located parallel to each other as such are tightly packed within the through passage of the sleeve.

A further embodiment of the present invention is where the basic embodiment is modified by the aligning sleeve being cylindrical.

A further embodiment of the present invention is where the basic embodiment is modified by the aligning sleeve being constructed of glass or other suitable materials.

A further embodiment of the present invention is where the basic embodiment is modified by the through passage being centrally located within the elongated body of the aligning sleeve.

A further embodiment of the present invention is where the basic embodiment is modified by the including of an enlarged tapered opening within the aft end of the sleeve to assist in the guiding and insertion of the fibers within the through passage of the elongated body of the aligning sleeve.

A further embodiment of the present invention is where the basic embodiment is modified by the fiberoptic cylindrical fibers being all of the same diameter.

A second basic embodiment of the present invention is directed to the combination of the fiberoptic fibers of the bundle in conjunction with the aligning sleeve with the number of the fibers within the fiberoptic bundle being within the group of 7, 19, 37, 61, 91, 127, 169, 217, 271, 331 . . . The aligning sleeve has an elongated body formed of a rigid material with the body having a fore end and an aft end. A through passage is formed within the body extending from the fore end to the aft end with this through passage being hexagonally shaped in transverse cross-section forming six in number of evenly spaced longitudinal corners with a single fiberoptic cable to nest in a corner forming a plurality of parallel corner fibers. All remaining fibers of the bundle of fibers precisely align with the corner fibers so that all the fibers in the bundle are located parallel to each other. Utilizing of the aligning sleeve of the present invention essentially eliminates the rejection in the manufacturing of a bundle of fibers due to excessive angular deviation and subsequently also eliminated the testing of the angular deviation of the fibers thereby eliminating a manufacturing step because it is assured that all fibers will be located essentially precisely parallel to each other within the bundle.

A further embodiment of the present invention is where the second basic embodiment is modified by the cylindrical fibers of the bundled fibers all being of the same diameter.

A further embodiment of the present invention is where the second basic embodiment is modified by the aligning sleeve being cylindrical in shape.

A further embodiment of the present invention is where the second basic embodiment is where the through passage formed within the aligning sleeve is centrally located.

A further embodiment of the present invention is where the second basic embodiment is modified by the aft end of the sleeve including an enlarged tapered opening which facilitates guiding insertion of the fiberoptic fibers within the through passage.

A further embodiment of the present invention is where the second basic embodiment is modified by there being formed within the group of fibers contained within the sleeve a centrally located fiber which can be utilized as a convenient point of reference when moving a light source from one fiber to another fiber. The centrally located fiber will be basically in alignment with the longitudinal center axis of the through passage.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 1 is a longitudinal cross-sectional view through the aligning sleeve of the present invention within which are mounted a bundle of fiberoptic fibers;

FIG. 2 is a transverse cross-sectional view taken along line 2—2 of FIG. 1;

FIG. 3 is an enlarged cross-sectional view taken along line 3—3 of FIG. 1;

FIG. 6 is a cross-sectional view similar to FIG. 2 of a modified aligning sleeve that is to function with seven in number of fiberoptic fibers;

FIG. 7 is a cross-sectional view similar to FIG. 2 of a further modified aligning sleeve that is to function with thirty-seven in number of fiberoptic fibers;

FIG. 8 is a cross-sectional view similar to FIG. 2 of a further modified aligning sleeve that is to function with sixty-one in number of fiberoptic fibers;

DETAILED DESCRIPTION OF THE INVENTION

Figure 9:
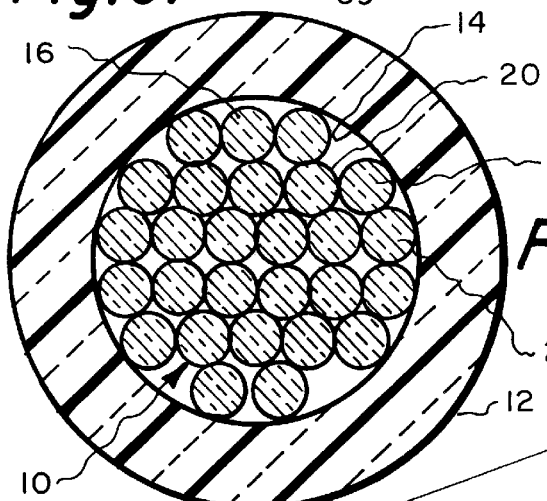
FIG. 9 is a cross-sectional view similar to FIG. 2 but of a prior art type of aligning sleeve.
Figure 10:
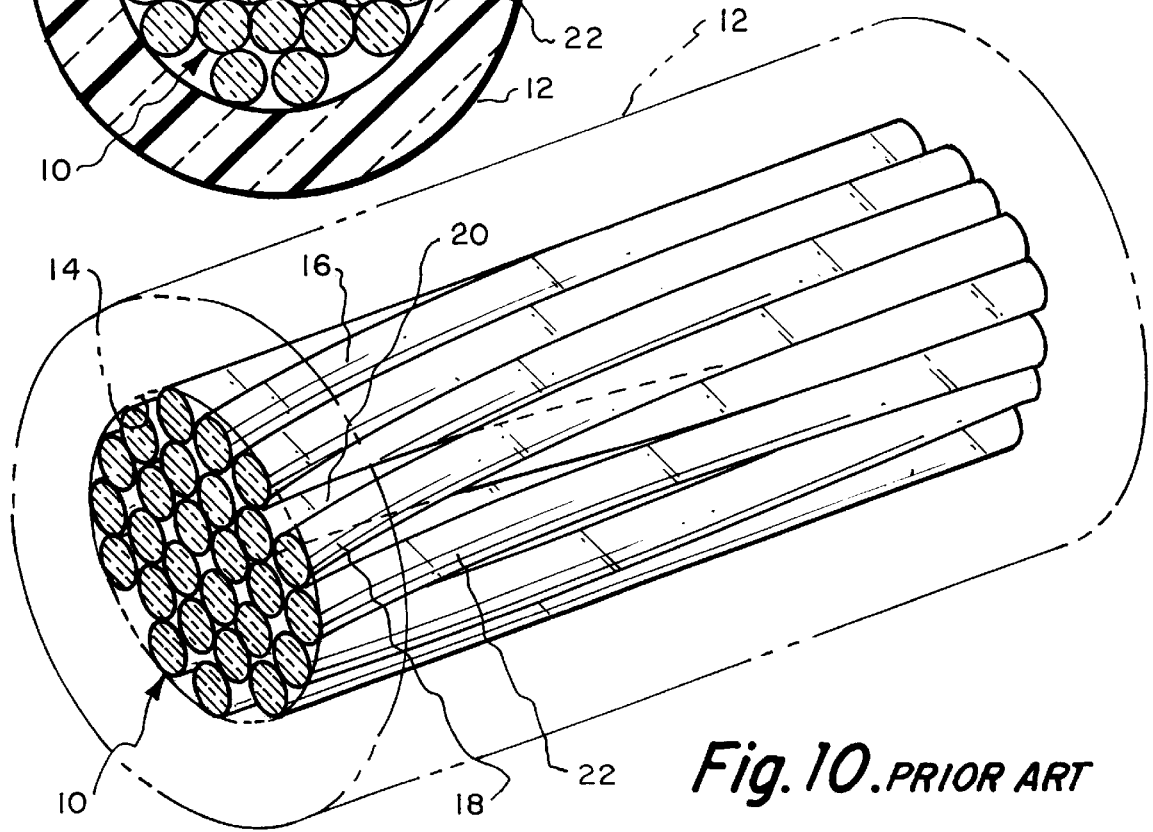
FIG. 10 is a view similar to FIG. 3 of the prior art type of aligning sleeve which is shown in FIG. 6.

Referring particularly to FIGS. 9 and 10, there is shown a plurality of fiberoptic fibers 10 that are located in a bundle. In reference to FIGS. 9 and 10, there are actually shown twenty-seven in number of the fiberoptic fibers 10. Each of the fibers 10 are basically identical and are of the same size. However, it is not necessary that all the fibers 10 be of the same size. Each of the fibers 10 are constructed of silica glass. In looking at an end of the fiber 10, it appears to be one continuous integral material which is no different in cross-section. Actually, the center portion of each fiber 10 is defined as a core and that core is specifically constructed to transmit an optical radiation within the wavelength range of typically 600 nm to 1650 nm. The core frequently varies in size from less than four microns to higher than one hundred microns. Surrounding the core is a cladding, which is made of silica glass with a lesser refractive index then the core and is integral with the core. The cladding will, of course, vary in thickness from greater than sixty microns to less than thirty microns. The cladding is designed to be reflective for the light pulse that is transmitted along the core. It is the function of the refractive index ratio between cladding to core to keep the light contained within the core and not permit the light to escape but only permit the light to be transmitted along the core. This construction of a fiberoptic fiber is deemed to be conventional and forms no specific part of this invention. In fact, fibers based on other principles, such as having a hollow core, would also work.

It is common for the bundle of the fibers 10 to have an end within which is to be transmitted the light pulse. The same light pulse could be transmitted throughout all the fibers 10 or there could be a different light pulse transmitted within each different fiber 10. It is to be understood that the cable that contains the fibers 10 could be very short in length or could be very long in length. Typically, such cables would be no more than a few meters in length or could be miles in length.

It is necessary to bind the fibers 10 in a tightly packed unit so that the fibers 10 can remain in a fixed position so that the desired individual transmission of the light pulse to each different fiber can then be ascertained and achieved. An epoxy resin (not shown) is placed within the assemblage of the fibers within the bundle of the fibers 10. The bundle of the fibers 10 is then inserted within a through opening 14 of an aligning sleeve 12. In the gap areas that is shown surrounding the cylindrical fibers 10, there will be located the epoxy resin. The aligning sleeve 12 has an exterior cylindrical configuration. The through opening 14 has a circular cross-sectional configuration. Almost invariably, because the through opening 14 is circular in cross-section, some of the fibers 10 will tend to become twisted, as is clearly represented by the twisted fibers 16, 18, 20 and 22 shown in FIG. 9. This slight twisting which is magnified in FIG. 9 for purposes of description, causes an angular deviation of the fiber which results in inefficient light coupling to or from the fiber. The reason that the twisting occurs is because the through opening 14 is circular in cross-section. There is no structure utilized within the through opening 14 which insures that each of the fibers 10 are maintained parallel to each other.

Figure 12:
FIG. 12 is a schematic view depicting a pair of fibers located end-to-end which are positioned to maximize efficiency of light transmission between the fibers.
Figure 11:
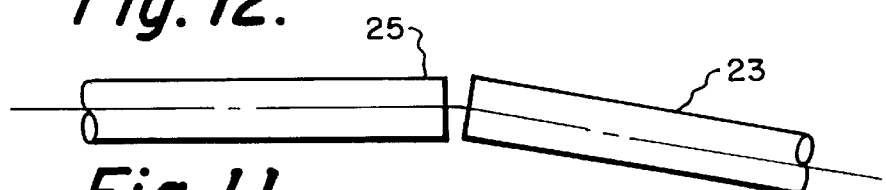
FIG. 11 is a schematic view depicting a pair of fibers located end-to-end which are positioned to be inefficient in the transmitting of light between the fibers.
Figure 13:
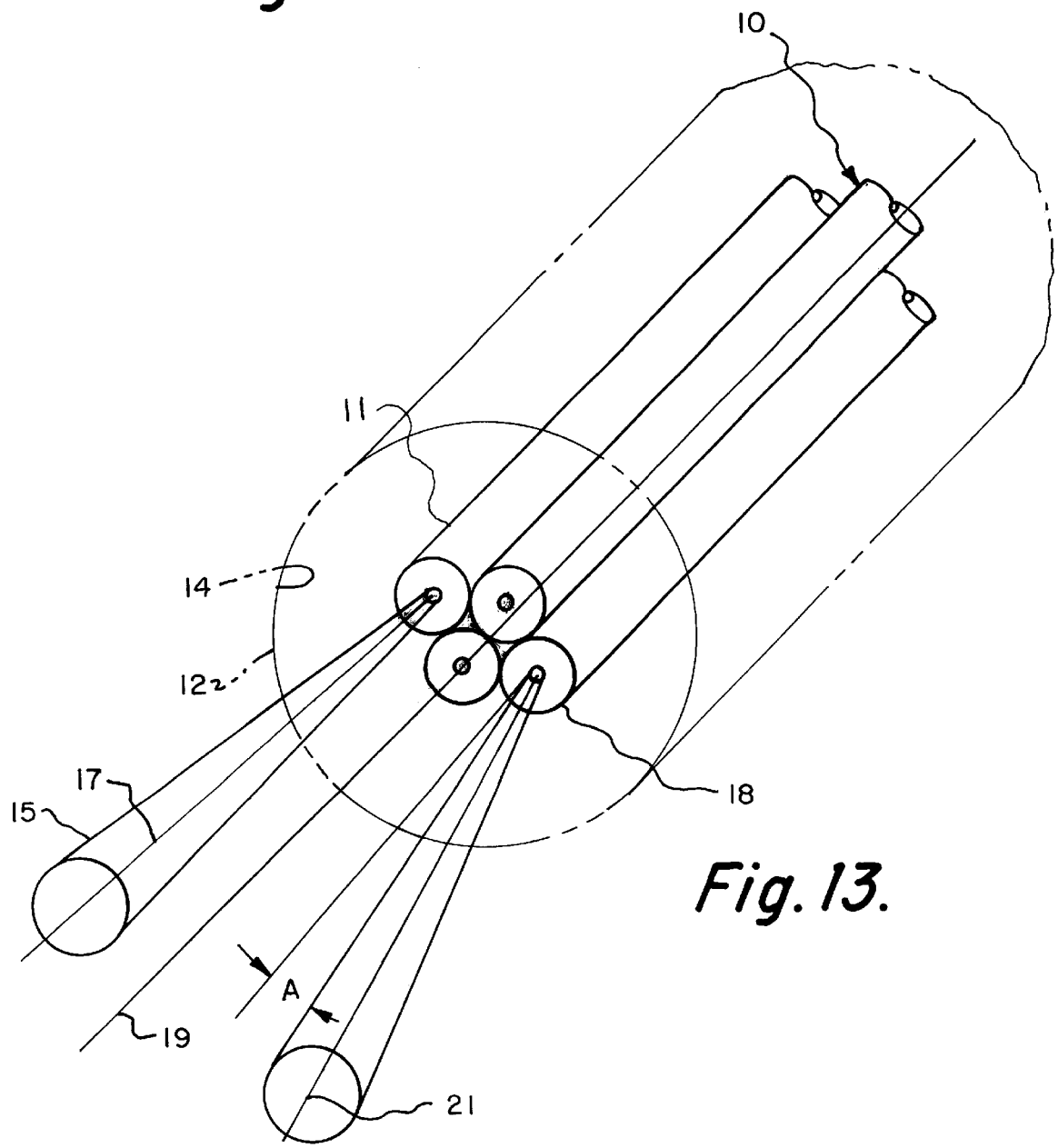
FIG. 13 is a schematic view depicting angular deviation of misaligned fibers within a bundle showing how light would be emitted from the fibers.

For purposes of description, reference is to be made to FIG. 13 which clearly depicts angular deviation of fiber 18 with the remaining fibers 10 being not deviated. Fiber 11 has a longitudinal center axis 17 which is parallel to longitudinal center axis 19 of the bundle of fibers 10. Light 15 will be directed from fiber 11 precisely parallel to axis 19. Fiber 18 has a longitudinal center axis 21 which is located at an angle "A" of deviation relative to longitudinal center axis 19. What occurs is when the bundle of fibers 10 are located to transmit light between one fiber 23 and another fiber 25, as shown in FIG. 11, inefficient transmission of light between the fibers 23 and 25 will occur. Only when the fibers 23 and 25 are aligned, as in FIG. 12, will efficient transmission occur.

Referring particularly to FIGS. 1 to 5 of the drawings, there is shown the aligning sleeve 24 of this invention. The aligning sleeve 24 is to be constructed of a rigid material with generally a glass being preferred. The aligning sleeve could be constructed to be transparent or could be constructed to be opaque. It is considered to be within the scope of this invention that the aligning sleeve 24 could be constructed of plastic or even metal. Typically, the aligning sleeve 24 would generally be no bigger in diameter than one-sixteenth to one-eighth of an inch. Although the aligning sleeve 24 is shown to be cylindrical in exterior configuration, the aligning sleeve 24 could have an exterior configuration other than cylindrical.

The aligning sleeve 24 has a fore end 26 and an aft end 28. Formed longitudinally through the aligning sleeve 24 is a through opening 30. Generally, the longitudinal center axis of the through opening 30 aligns with the longitudinal center axis of the aligning sleeve 24. The basic configuration of the through opening 30 in transverse cross-section is hexagonal forming six in number of evenly spaced apart corners 32. Each corner extends the entire length of the through opening 30. At the aft end 28, the through opening 30 forms a guide opening 34. The guide opening 34 is still hexagonal but enlarged and tapered and is to function to compact the fibers 36 as such are inserted in direction of arrow 38 in FIG. 4 within the through opening 30. The fibers 36 are immersed with epoxy resin 39 prior to insertion into through opening 30. The fibers 36 are to be inserted until they protrude from the fore end 26. The protruding portion 40 of the fibers 36 is to severed after hardening of epoxy resin 39 and discarded. The protruding portion 40 is severed flush with the fore end 26. Each fiber 36 that extends from sleeve 24 is covered with an insulative cover 37 which usually comprise rubber or plastic. The fibers 36 are basically identical to the fibers 10, which have been previously described.

Figure 4:
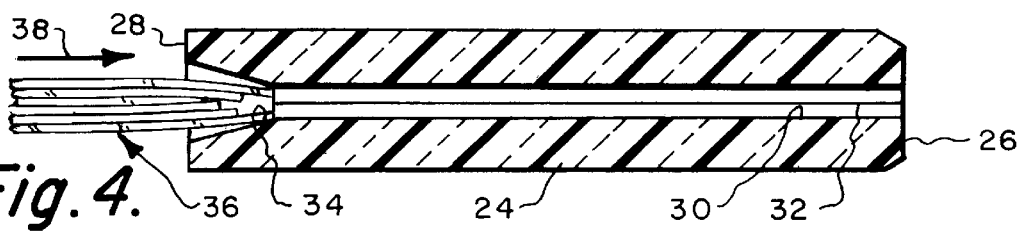
FIG. 4 is a longitudinal cross-sectional view showing the aligning sleeve with a bundle of fiberoptic fibers in process of being inserted within the through passage formed within the aligning sleeve.
Figure 5:
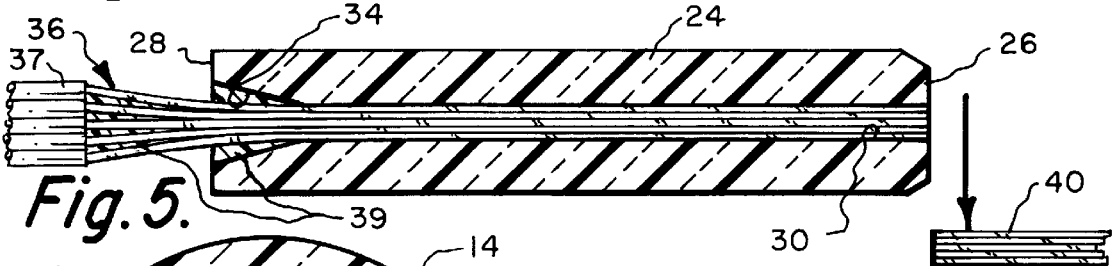
FIG. 5 is a cross sectional view similar to FIG. 4 but where the fiberoptic fibers have been completely installed within the through passage of the aligning sleeve and the portion of the fiberoptic fibers that extend exteriorly of the aligning sleeve showing being cut so that the outer end of the fiberoptic fibers align with the fore end of the aligning sleeve.

When the bundle of fibers 36 is inserted within the through opening 30, the fibers 36 are moved to a tightly packed state because the size of the through opening 30 is precisely the size to accommodate the 19 fibers that is shown in FIGS. 2 and 3. The forming of the through opening 30 and the guide opening 34 to be hexagonal is accomplished by known manufacturing techniques and need not be discussed here in detail. As the fibers 36 are moved into the through opening 30, as is shown in FIG. 4, automatically one of the fibers 36 will nest within each corner 32. Nesting means a fiber will kind of fit within each corner 32 and will assume a straight longitudinal position within the corner 32. This means there will be six in number of these corner fibers 42. Each of these corner fibers 42 will be located parallel to each other and will also be parallel to the longitudinal center axis of the through opening 30. Located between each directly adjacent pair of corner fibers 42 will be a single one of the fibers 36. All the remaining fibers will automatically align with the corner fibers 42 which means that all of the fibers 36 will assume a straight and parallel relationship within the through opening 30. The net result is that all fibers 36 end up precisely parallel so that when light pulses are applied to the free end of the fibers 36, the light pulses will be coupled with maximum efficiency into the core of the fibers 36.

In the selecting of the numbers of the fibers 36 that would just compactly fill the through opening 30, it happens to be that the number of the fibers 36 to achieve this is number nineteen, in FIGS. 2 and 3. There is a centrally located fiber 44 which is desirable as it provides a mechanical reference when aligning such a fiber bundle. The centrally located fiber 44 can be used as a point of reference when moving a light source between the different fibers 36. Therefore, the group of fibers 36 within the bundle is always selected so that there is a centrally located fiber 44. The obtaining of corner fibers 42 as well as the central fiber 44 is also obtained when there are only seven in number of the fibers 36 used, sleeve 24' in FIG. 6, or when there are 37 in number of fibers 36, as by sleeve 24" shown in FIG. 7, or when there are 61 in number of fibers 36, as shown by sleeve 24" in FIG. 8. The additional numbers of fibers 36 that will produce a tightly packed bundle in a hexagonal opening 30 and also produce a centrally located fiber 44 are as follows: 397, 469, 547, 631, 721, 817, 919, 1027, 1141, 1261, 1387, 1519, 1657, 1801, 1951, 2107, 2269, 2437, 2611, 2791, 2977, 3169, 3367, 3571, 3781, 4219, 4447, 4661, 4921, 5167, 5419, 5677, 5941, 6211, 6487, 6769, 7057, and 7351 . . . .

By using the hexagonal through opening 30 within the aligning sleeve 24 of this invention, it is insured that all fibers 36 comprising the bundle remain parallel. Because all the fibers 36 in the bundle remain parallel, the angular deviation between the fibers 36 can be ignored and does not have to be measured. This results in significant cost reduction when manufacturing optical fiber bundles.

What is claimed is:

1. An aligning sleeve for a bundle of fiberoptic cylindrical fibers comprising:

an elongated body formed of a rigid material, said body having a fore end and an aft end; and a through passage formed within said body extending from said fore end to said aft end, said through passage being hexagonally shaped in transverse cross-section forming six in number of evenly spaced apart longitudinal corners with a single fiberoptic fiber to nest in a said corner forming a plurality of parallel corner fibers, whereby all remaining fibers align with the corner fibers so all fibers in the bundle are located parallel to each other within said body and tightly packed within said through passage.

2. The aligning sleeve as defined in claim 1 wherein: said body being cylindrical.

3. The aligning sleeve as defined in claim 1 wherein: said body being formed of glass.

4. The aligning sleeve as defined in claim 1 wherein: said through passage being centrally located within said body.

5. The aligning sleeve as defined in claim 1 wherein:

an aft portion of said through passage located directly adjacent said aft end being expanded in size and being tapered to the remaining portion of said through passage, whereby said aft portion of said through passage functioning as a guide to direct the bundle of fiberoptic cylindrical fibers to within said remaining portion of said through passage.

6. The aligning sleeve as defined in claim 1 wherein:

said fibers all being of the same diameter.

7. In combination with a plurality of cylindrical fiberoptic fibers which are located in a bundle, the number of said fibers being within the group of 7, 19, 37, 61, 91, 127, 169, 217, 271 and 331, an aligning sleeve usable with said fibers comprising:

an elongated body formed of a rigid material, said body having a fore end and an aft end;

a through passage formed within said body extending from said fore end to said aft end, said through passage being hexagonally shaped in transverse cross-section forming six in number of evenly spaced apart longitudinal corners with a single said fiberoptic fiber to nest in a said corner forming a plurality of parallel corner fibers, whereby all remaining said fibers align with said corner fibers so all said fibers in said bundle are located parallel to each other within said body and tightly packed within said through passage.

8. The combination as defined in claim 7 wherein:

said fibers including a centrally located fiber being located in alignment with a longitudinal center axis of said through passage.

9. The combination as defined in claim 8 wherein:

said elongated body being cylindrical.

10. The combination as defined in claim 9 wherein:

said through passage being centrally located within said body.

11. The combination as defined in claim 10 wherein:

an aft portion of said through passage located directly adjacent said aft end being expanded in size and being tapered to the remaining portion of said through passage, whereby said aft portion of said through passage functioning as a guide to direct the bundle of fiberoptic cylindrical fibers to within said remaining portion of said through passage.

12. The combination as defined in claim 7 wherein:

said fibers all being of the same diameter.

13. The combination as defined in claim 7 wherein:

said elongated body being cylindrical.

14. The combination as defined in claim 7 wherein:

said through passage being centrally located within said body.

15. The combination as defined in claim 7 wherein:

an aft portion of said through passage located directly adjacent said aft end being expanded in size and being tapered to the remaining portion of said through passage, whereby said aft portion of said through passage functioning as a guide to direct the bundle of fiberoptic cylindrical fibers to within said remaining portion of said through passage.

* * * * *